United States Patent
Nakatsuji

(10) Patent No.: US 7,175,822 B2
(45) Date of Patent: Feb. 13, 2007

(54) METHOD FOR CATALYTIC REDUCTION OF NITROGEN OXIDES

(75) Inventor: Tadao Nakatsuji, Espoo (FI)

(73) Assignees: Valtion Teknillinen Tutkimuskeskus, Espoo (FI); Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/485,072

(22) PCT Filed: Jul. 29, 2002

(86) PCT No.: PCT/JP02/07703

§ 371 (c)(1),
(2), (4) Date: Jan. 28, 2004

(87) PCT Pub. No.: WO03/011438

PCT Pub. Date: Feb. 13, 2003

(65) Prior Publication Data

US 2004/0184978 A1 Sep. 23, 2004

(30) Foreign Application Priority Data

Jul. 30, 2001 (JP) ............................. 2001-230682
Aug. 16, 2001 (JP) ............................. 2001-247501

(51) Int. Cl.
*B01D 53/56* (2006.01)
(52) U.S. Cl. .................................................. 423/239.1
(58) Field of Classification Search ............. 423/239.1; 502/303, 304, 325, 302, 313, 314
See application file for complete search history.

(56) References Cited

U.S. PATENT DOCUMENTS 5,376,610 A * 12/1994 Takahata et al. ............... 502/66
5,849,660 A * 12/1998 Takemoto et al. ............ 502/327
5,958,828 A * 9/1999 Murakami et al. ........... 502/333
6,107,239 A * 8/2000 Qin et al. ..................... 502/300
6,143,691 A * 11/2000 Shiraishi et al. ............. 502/304
6,524,992 B2 * 2/2003 Mussmann et al. .......... 502/304
6,620,392 B2 * 9/2003 Okamoto et al. ......... 423/213.5
6,777,370 B2 * 8/2004 Chen .......................... 502/241
6,852,666 B1 * 2/2005 Bouly et al. ................. 502/304

* cited by examiner

*Primary Examiner*—Edward M. Johnson
(74) *Attorney, Agent, or Firm*—Wenderoth, Lind & Ponack, L.L.P.

(57) ABSTRACT

The invention provides a catalyst structure for catalytic reduction of nitrogen oxides in exhaust gases by supplying and subjecting fuel to combustion with periodic rich/lean excursions and contacting the resulting exhaust gases with the catalyst structure, wherein the catalyst structure comprises, on an inactive substrate:
(A) an outer catalyst layer comprising an outer layer catalyst component wherein the outer layer catalyst component comprises a first catalyst component comprising a mixture or a composite oxide (except mixtures or composite oxides of cerium oxides and zirconium oxides) of
  (a) ceria and
  (b) at least one oxide of at least one element selected from zirconium, gadolinium, terbium, samarium and lanthanum, and a second catalyst component comprising
  (c) at least one catalyst component selected from rhodium, palladium and their oxides, and
  (B) an inner catalyst layer comprising an inner layer catalyst component wherein the inner layer catalyst component comprises
  (a) at least one catalyst component selected from platinum, rhodium, palladium and their oxides, and
  (b) a carrier material.

4 Claims, No Drawings

METHOD FOR CATALYTIC REDUCTION OF NITROGEN OXIDES

FIELD OF THE INVENTION

The invention relates to a method for catalytic reduction of nitrogen oxides (which mainly comprises NO and $NO_2$, and will be referred to as NOx hereunder) by using a catalyst. More particularly, the invention relates to a method for catalytic reduction of nitrogen oxides in exhaust gases by supplying and subjecting fuel to combustion with periodic rich/lean excursions and contacting the resulting exhaust gases with a catalyst. The method is suitable for reducing and removing harmful nitrogen oxides contained in exhaust gases, e.g., from automobiles.

The invention further relates to a durable catalyst that is capable of reducing nitrogen oxides in exhaust gases by supplying and subjecting fuel to combustion with periodic rich/lean excursions and contacting the resulting exhaust gases with the catalyst even in the presence of sulfur oxides (which mainly comprises $SO_2$ and $SO_3$, and will be referred to as SOx hereunder).

The first of the present inventions relates to a method for catalytic reduction of nitrogen oxides contained in exhaust gases which uses a catalyst comprising:

(A) an outer catalyst layer comprising an outer layer catalyst component wherein the outer layer catalyst component comprises a first catalyst component comprising a mixture or a composite oxide (except mixtures or composite oxides of cerium oxides and zirconium oxides) of
  (a) ceria and
  (b) at least one oxide of at least one element selected from zirconium, gadolinium, terbium, samarium and lanthanum, and a second catalyst component comprising
  (c) at least one catalyst component selected from rhodium, palladium and their oxides, and
(B) an inner catalyst layer comprising an inner layer catalyst component wherein the inner layer catalyst component comprises
  (a) at least one catalyst component selected from platinum, rhodium, palladium and their oxides, and
  (b) a carrier material.

The invention also relates to such a catalyst as mentioned above for catalytic reduction of nitrogen oxides contained in exhaust gases.

The second of the present inventions relates to a method of catalytic reduction of nitrogen oxides contained in exhaust gases which uses a catalyst comprising:

(A) an outer catalyst layer comprising an outer layer catalyst component wherein the outer layer catalyst component comprises a first catalyst component comprising a mixture or a composite oxide (except mixtures or composite oxides of cerium oxides and zirconium oxides) of
  (a) ceria and
  (b) at least one oxide of at least one element selected from zirconium, gadolinium, terbium, samarium and lanthanum, and a second catalyst component comprising
  (c) at least one catalyst component selected from rhodium, palladium and their oxides, and
(B) an inner catalyst layer comprising an inner layer catalyst component wherein the inner layer catalyst component comprises
  (a) at least one catalyst component selected from platinum, rhodium, palladium and their oxides, and
  (b) a carrier material.

The invention also relates to such a catalyst as mentioned above for catalytic reduction of nitrogen oxides contained in exhaust gases.

By the term "excursion" is meant a movement of air/fuel ratio outward and back from a mean value along a time axis. By "rich" is meant an air/fuel ratio smaller than the stoichiometric air/fuel ratio of the fuel in question. By "lean" is meant an air/fuel ratio larger than the stoichiometric air/fuel ratio of the fuel in question. For normal automobile gasoline, the stoichiometric air/fuel ratio is about 14.5. The term "catalyst" includes a catalyst itself as well as a catalyst structure which works to remove NOx during rich/lean combustion of fuel.

Accordingly, by the term "supplying fuel with periodic rich/lean excursion" is especially meant that fuel is injected into a combustion chamber of a diesel engine or a gasoline engine and is subjected to combustion mainly under the lean conditions (wherein the oxygen concentration of the exhaust gases after combustion of fuel is in the range of 5% to 10%) while air/fuel ratio is so adjusted that the combustion atmosphere of fuel is periodically oscillated between the rich conditions and lean conditions. Therefore, "the rich/lean excursions" has the same meaning as "the rich/lean conditions".

BACK GROUND OF THE INVENTION

Nitrogen oxides contained in exhaust gases have been removed by, for example, a method in which the nitrogen oxides are oxidized and then absorbed in an alkaline solution or a method in which the nitrogen oxides are reduced to nitrogen by using a reducing agent such as ammonia, hydrogen, carbon monoxide or hydrocarbons.

However, these conventional methods have their own disadvantages. That is, the former method requires a means for handling the resulting alkaline waste liquid to prevent environmental pollution. The latter method, foe example, when it uses ammonia as a reducing agent, involves the problem that ammonia reacts with sulfur oxides in the exhaust gases to form salts, resulting in deterioration in catalytic activity at low temperatures. Especially, when NOx generated from moving sources is treated, there arises a problem of safety.

On the other hand, when a three way catalyst is employed and hydrogen, carbon monoxide or hydrocarbons are used as a reducing agent, the reducing agent reacts preferentially with oxygen since the waste gas contains oxygen in a higher concentration than NOx. This means that substantial reduction of nitrogen oxides needs a large quantity of the reducing agent.

It was therefore proposed to decompose nitrogen oxides catalytically in the absence of a reducing agent. However, known catalysts for direct decomposition of nitrogen oxides have not yet been put to practical use due to their low decomposing activity. On the other hand, a variety of zeolites were proposed as a catalyst for the catalytic reduction of nitrogen oxides using a hydrocarbon or an oxygen-containing organic compound as a reducing agent. In particular, Cu-ion exchanged ZSM-5 or H type (acid type) zeolite ZSM-5 ($SiO_2/Al_2O_3$ molar ratio=30 to 40) is regarded optimal. However, it was found that even the H type zeolite ZSM-5 has not sufficient catalytic reduction activity. In particular, the zeolite catalyst was deactivated quickly on account of dealumination of the zeolite structure when water was contained in the exhaust gas.

Under these circumstances, it has been necessary to develop a more active catalyst for the catalytic reduction of nitrogen oxides. Accordingly, a catalyst composed of an inorganic oxide carrier material having silver or silver oxide supported thereon has recently been proposed, as described in EP-A1-526099 or EP-A1-679427 (corresponding to JP-A2-5-317647). However, it has been found that the catalyst has a high activity for selective reduction of NOx, but a low activity for oxidation, so that the catalyst has a low conversion rate of nitrogen oxides to nitrogen, that is, the catalyst is highly dependent on SV (space velocity). In addition, the catalyst involves a problem that it is deactivated rapidly in the presence of sulfur oxides. The catalyst catalyzes the selective reduction of NOx with hydrocarbons under full lean conditions, but it has a lower NOx conversion and a narrower temperature window (temperature range) than the three way catalyst. This makes it difficult for such lean NOx catalysts to be practically used. Thus, there has been a demand for developing a more heat-resistant and active catalyst or catalytic system for the catalytic reduction of nitrogen oxides.

In order to overcome these problems, a NOx storage-reduction system has recently been proposed as one of the most promising methods, as described in "Society of Automotive Engineers" (SAE) Paper (Aug. 8, 1995). In the proposed system (Toyota Motor Corporation), fuel is periodically for a short moment spiked into a combustion chamber in excess of the stoichiometric amount. Vehicles with lean burn engines can be driven at lower consumption rates than conventional vehicles. It is because such vehicles can be driven using a much lower fuel/air ratio than the conventional vehicles. This NOx storage-reduction system for lean combustion engines reduces NOx in periodic two steps at intervals of one to two minutes.

In the first step, NO is oxidized to $NO_2$ on a platinum or rhodium catalyst under (normal) lean conditions, and the $NO_2$ is adsorbed on such alkali compounds as $K_2CO_3$ or $BaCO_3$. Subsequently, rich conditions are formed for the second step, and the rich conditions are maintained for several seconds. Under the rich conditions, the adsorbed (or stored) $NO_2$ is efficiently reduced to nitrogen with hydrocarbons, carbon monoxide or hydrogen on the platinum or rhodium catalyst. This system works well for a long period in the absence of SOx. However, in the presence of SOx, the system deteriorates drastically due to the irreversible adsorption of SOx on the $NO_2$ adsorption sites under either conditions, lean or rich.

SUMMARY OF THE INVENTION

It is an object of the invention to provide a method for catalytic reduction of nitrogen oxides (NOx) in exhaust gases generated by combustion of fuel under periodic rich/lean conditions by contacting the resulting exhaust gases with a catalyst with high durability even in the presence of oxygen, sulfur oxides or water, or at high reaction temperatures.

Either in the first or the second invention, it is important that the first catalyst component of the outer catalyst layer that has oxygen storage capability is reduced promptly in the rich excursion with the aid of high reducing ability of noble metal catalyst component of the outer catalyst layer and the inner catalyst layer so that the first catalyst component of the outer catalyst layer stores oxygen effectively in the following lean excursion. That is, it is important that the first catalyst component of the outer catalyst layer is regenerated in the rich excursion so that it stores oxygen in exhaust gases under the following lean conditions and as the results, the reaction atmosphere of the noble metal catalyst component in the outer catalyst layer is maintained rich or stoichiometric under the lean conditions. When the inner catalyst layer contains a co-catalyst that comprises ions and/or oxides of at least one element selected from iron, cobalt and nickel and has resistance to SOx according to the second invention, the first catalyst component of the outer catalyst layer is more efficiently and more promptly reduced in the rich excursion with the aid of the co-catalyst as well as with the aid of high reducing ability of noble metal catalyst component of the inner catalyst layer.

Furthermore, either in the first or the second of the present inventions, the noble metal catalyst components in the outer catalyst layer and the inner catalyst layer that have been oxidized in the lean excursion are reduced in the rich excursion or under the reducing conditions, and NOx is selectively and catalytically reduced on the thus regenerated noble metal catalyst. When the inner catalyst layer contains a co-catalyst according to the second invention, the co-catalyst enhances the NOx reducing ability of the noble metal catalyst component in the inner catalyst layer and accelerates the reaction of catalytic reduction of NOx on the catalyst.

In the subsequent lean excursion or under the oxidizing conditions, NOx is selectively and catalytically reduced on the noble metal catalyst component in the outer catalyst layer. That is, the noble metal catalyst component of the inner catalyst layer as well as the first catalyst component in the outer catalyst layer that has been reduced with the aid of high reducing ability of noble metal catalyst component of the inner catalyst layer prevents the oxidation of the second catalyst component or noble metal catalyst component in the outer catalyst layer such as rhodium, and as results, the reducing reaction of NOx in exhaust gases is continued with high efficiency on the noble metal catalyst component in the outer catalyst layer. Again, when the inner catalyst layer contains a co-catalyst according to the second invention, the first catalyst component in the outer catalyst layer that has been reduced with the aid of high reducing ability of noble metal catalyst component of the inner catalyst layer and the co-catalyst prevents the oxidation of the second catalyst component of noble metal component such as rhodium more effectively under the lean conditions, and hence the co-catalyst accelerates the reducing reaction of NOx in exhause gases on the noble metal catalyst component.

In particular, it is an object of the invention to provide a highly durable catalyst for catalytic reduction of NOx in the lean excursion of periodic rich/lean combustion of fuel at a broad temperature range with no deterioration in the presence of oxygen, sulfur oxides or water, especially in the presence of sulfur oxides which brings about serious problem to the NOx storage catalyst. The reason why the catalyst of the invention is highly durable in the presence of sulfur oxides is that the coexistent sulfur oxides are adsorbed as $SO_2$ under the lean conditions on the outer catalyst layer and is desorbed into the gas phase under the rich conditions, and thus the sulfur oxides are not stored in the catalyst irreversibly as in the case of NOx storage catalyst.

It is a further object of the invention to provide a catalyst structure for catalytic reduction of NOx which comprises the catalyst supported on an inactive substrate.

The first of the present inventions provides a method of catalytic reduction of nitrogen oxides in exhaust gases by supplying and subject fuel to combustion with periodic rich/lean excursions and contacting the resulting exhaust gases with a catalyst which comprises:
(A) an outer catalyst layer comprising an outer layer catalyst component wherein the outer layer catalyst component comprises a first catalyst component comprising a mixture or a composite oxide (except mixtures or composite oxides of cerium oxides and zirconium oxides) of
(a) ceria and
(b) at least one oxide of at least one element selected from zirconium, gadolinium, terbium, samarium and lanthanum, and a second catalyst component comprising
(c) at least one catalyst component selected from rhodium, palladium and their oxides, and
(B) an inner catalyst layer comprising an inner layer catalyst component wherein the inner layer catalyst component comprises
(a) at least one catalyst component selected from platinum, rhodium, palladium and their oxides, and
(b) a carrier material.

Further according to the first of the present inventions, there is provided such a catalyst for catalytic reduction of nitrogen oxides contained in exhaust gases by supplying and subject fuel to combustion with periodic rich/lean excursions and contacting the resulting exhaust gases with the catalyst which comprises the outer catalyst layer and the inner catalyst layer as mentioned above.

The second of the present inventions provides a method of catalytic reduction of nitrogen oxides in exhaust gases by supplying and subject fuel to combustion with periodic rich/lean excursions and contacting the resulting exhaust gases with a catalyst which comprises:
(A) an outer catalyst layer comprising an outer layer catalyst component wherein the outer layer catalyst component comprises a first catalyst component comprising a mixture or a composite oxide (except mixtures or composite oxides of cerium oxides and zirconium oxides) of
(a) ceria and
(b) at least one oxide of at least one element selected from zirconium, gadolinium, terbium, samarium and lanthanum, and a second catalyst component comprising
(c) at least one catalyst component selected from rhodium, palladium and their oxides, and
(B) an inner catalyst layer comprising an inner layer catalyst component wherein the outer layer catalyst component comprises
(a) at least one catalyst component selected from platinum, rhodium, palladium and their oxides, and
(b) a carrier material.

Further according to the second of the present inventions, there is provided such a catalyst for catalytic reduction of nitrogen oxides contained in exhaust gases by supplying and subject fuel to combustion with periodic rich/lean excursions and contacting the resulting exhaust gases with the catalyst which comprises the outer catalyst layer and the inner catalyst layer as mentioned above.

DESCRIPTION OF THE PREFERRED EMBODIMENTS

The catalyst for catalytic reduction of nitrogen oxides comprises an outer or surface catalyst layer and an inner catalyst layer, and the catalyst may have any catalyst structure if the outer catalyst layer is exposed so that it is contacted with exhaust gases directly. Preferably the catalyst of the invention is used as a catalyst structure comprising an inactive substrate supporting the inner catalyst layer and the outer catalyst layer thereon in this order.

Herein the invention, the catalytic reduction of nitrogen oxides (NOx) means that most of them are decomposed to nitrogen and oxygen directly by a catalyst reaction. Some of NOx produces nitrogen, water, carbon monoxide and carbon dioxide by the reaction of the reducing agent used.

First, the method and the catalyst for catalytic reduction of nitrogen oxides according to the first of the present inventions will be described.

According to the first invention, the outer catalyst layer (A) of the catalyst comprises an outer layer catalyst component and the outer layer catalyst component comprises a first catalyst component comprising a mixture or a composite oxide (except mixtures of cerium oxides and zirconium oxides) of
(a) ceria and
(b) at least one oxide of at least one element selected from zirconium, gadolinium, terbium, samarium and lanthanum, and a second catalyst component comprising
(c) at least one catalyst component selected from rhodium, palladium and their oxides.

On the other hand, the inner catalyst layer (B) of the catalyst comprises an inner layer catalyst component and the inner layer catalyst component comprises:
(a) at least one catalyst component selected from platinum, rhodium, palladium and their oxides, and
(b) a carrier material.

According to the first invention, the outer catalyst layer contains the outer layer catalyst component in an amount of at least 50% by weight, preferably in an amount of at least 80% by weight. When the amount of the outer layer catalyst component is less than 50% by weight based on the outer catalyst layer, the oxygen storage capacity of the resulting outer catalyst layer is not sufficient to maintain the atmosphere of the inner catalyst layer reductive for the period of normal lean excursion (from one to two minutes), and as results, the NOx reduction rate is lowered under the lean excursion as well as the resistance to SOx of the catalyst is deteriorated.

According to the first invention, the first catalyst component of the outer catalyst layer is promptly reduced over a short period of rich excursion with the aid of the second catalyst component of the outer catalyst layer as well as with the aid of the noble metal catalyst component of the inner catalyst layer such as platinum. That is, the oxides (for example, ceria), lose a part of their oxygen, and on the other hand, they store oxygen in the gas phase under the subsequent lean conditions. Thus, the first catalyst component of the outer catalyst layer functions as a material that is capable of storing oxygen (OSC material). In this way, the first catalyst component or the OSC material of the outer catalyst layer restrains the oxidation of the second catalyst component of the outer catalyst layer such as rhodium or palladium under the lean conditions, thereby making it possible to proceed the reduction reaction of NOx on the catalyst component such as rhodium or palladium at high efficiency.

As mentioned above, according to the first invention, the first catalyst component that functions as the OSC material in the outer catalyst layer comprises a mixture or a composite oxide (or solid solution) of:
(a) ceria and
(b) at least one oxide of at least one element selected from zirconium, gadolinium, terbium, samarium and lanthanum, except the mixtures or the composite oxides of cerium oxides and zirconium oxides.

It is preferred that the mixture is a uniform mixture. However, the composite oxides of two or more of the elements as mentioned above are more preferably used than the mixture. In particular, binary or ternary composite oxides or solid solutions are preferred among these.

In the case of binary composite oxides, for example, ceria/terbium oxide composite oxides or ceria/samarium oxide composite oxides, the weight ratio in terms of oxides of the elements in the composite oxide is preferably in the range of 80/20 to 60/40. In turn, in the case of ternary composite oxides, for example, ceria/gadolinium oxide/zirconia composite oxides, ceria/zirconia/gadolinium oxide composite oxide, ceria/zirconia/lanthanum oxide composite oxides, ceria/zirconia/samarium oxide composite oxides, or ceria/zirconia/terbium oxide composite oxides, the weight ratio in terms of oxides of the elements in the composite oxide is preferably in the range of 45/30/30 to 75/20/5. The weight ratio in terms of oxides in the composite oxides is calculated provided that ceria, zirconia, terbium oxides, gadolinium oxides, samarium oxides and lanthanum oxides are represented by $CeO_2$, $ZrO_2$, $Ga_2O_3$, $Sm_2O_3$ and $La_2O_3$, respectively.

According to the first invention, the outer catalyst layer contains the second catalyst component comprising at least one selected from rhodium, palladium and their oxides in addition to the first catalyst component mentioned above, and it is preferred that the second catalyst component is supported on the first catalyst component or the OSC material. According to the invention, the second catalyst component is contained in an amount of 0.05–3% by weight based on the catalyst components of the outer catalyst layer.

The second catalyst component accelerates the reduction of OSC material under the rich conditions, and at the same time, the second catalyst component is reduced so as to function as active species of the NOx decomposition reaction and has a role to reduce and decompose NOx promptly under the lean conditions.

In the first invention, the thickness of the outer catalyst layer has a great influence on the NOx reduction activity in the rich/lean excursions and the resistance to SOx of the catalyst. The optimum thickness of the outer catalyst layer depends on the reaction conditions such as temperature, oxygen concentration or space velocity under which the reaction is carried out, however, it is generally preferred that the thickness of outer catalyst layer is in the range of 20 μm to 80 μm so that the catalyst is highly active in the catalytic reduction of NOx in the rich/lean excursions, and most preferably it is about 40 μm. If the outer catalyst layer is more than 80 μm in thickness, the catalyst is not improved in the catalytic activity accordingly, but on the contrary, it is deteriorated in the catalyst activity. On the other hand, if the outer catalyst layer is less than 20 μm in thickness, NOx is oxidized on the inner catalyst layer under the lean conditions so that the catalyst activity is deteriorated. The thickness of catalyst layer may be calculated from the amount of the catalyst containing slurry coated on a substrate assuming that for purpose of convenience the catalyst layer has an apparent density of 1.0 g/cm$^3$.

The outer layer catalyst component of the outer catalyst layer in the first invention is obtained, for example, by methods as follows. First, an aqueous solution of water-soluble salt of the element such as cerium or zirconium that forms the first catalyst component, for example, as nitrate, is neutralized or heated and hydrolyzed to form a hydroxide, and the hydroxide is then calcined at a temperature of 300–900° C. under an oxidative or reducing atmosphere thereby providing the first catalyst component. However, the first catalyst component is also obtained by calcining oxides or hydroxides of cerium or zirconium available on the market. Then, an aqueous solution of water-soluble salt of the element that forms the second catalyst component, for example, as nitrate, is supported on the first catalyst component by a known suitable method such as an impregnation method or an ion exchange method, and the resulting product is calcined at a temperature of 500–900° C. under an oxidative or reducing atmosphere thereby providing the outer layer catalyst component as powder comprising the first catalyst component and the second catalyst component.

According to the first of the present invention, nitrogen oxides are reduced in the rich excursion or under the reducing conditions in such a manner as follows. The noble metal catalyst component of the inner catalyst layer and the noble metal catalyst component of the outer catalyst layer that have been oxidized in the lean excursion are reduced in the rich excursion and thus NOx is catalytically decomposed on these catalyst components. In addition, since oxygen is reduced promptly with the reducing agent on the noble metal catalyst component, the oxygen of the first catalyst component of the outer catalyst layer or the OSC material "spills over" into the inner catalyst layer, and as results, the OSC material is reduced in part efficiently together with the second catalyst component of the outer catalyst layer. That is, the OSC material is regenerated so that it works in the subsequent lean excursion.

In the lean excursion, i.e., in the oxidizing conditions following the rich excursion, nitrogen oxides are reduced in such a manner as follows. The oxygen that has diffused into the outer catalyst layer in the lean excursion is stored in the first catalyst component or the OSC material so that the reaction atmosphere around the second catalyst component of the outer catalyst layer is kept rich or stoichiometric, and accordingly, NOx is catalytically decomposed promptly on the second catalyst component of the outer catalyst layer even under the lean conditions.

Furthermore, according to the invention, SOx is trapped on the outer catalyst layer and then it is detached and released therefrom in the rich excursion. Therefore, the catalyst of the invention does not deteriorate even in the presence of SOx. Part of NOx adsorbed under the lean conditions is reduced with a reducing agent under the rich conditions.

According to the first of the present inventions, the inner catalyst layer contains the inner layer catalyst component at least in an amount of 50% by weight, preferably in an amount of 80% by weight. When the amount of the inner layer catalyst component in the inner catalyst layer is less than 50% by weight, the inner catalyst layer is decreased in the NOx catalytic reduction activity under the rich conditions as well as in the effect of aiding the reduction of the noble metal catalyst component and the OSC material of the outer catalyst layer.

The inner catalyst layer comprises an inner layer catalyst component and the inner layer catalyst component comprises a noble metal catalyst component and a carrier material. The noble metal catalyst component comprises at least one selected from platinum, rhodium, palladium and their oxides. The inner catalyst layer contains the noble metal catalyst component in an amount of in the range of 0.05–5% by weight in terms of metals. If the amount of the noble metal catalyst component is more than 5% by weight based on the inner catalyst layer, the reactivity of NOx and a reducing agent is not imoroved. On the other hand, when the amount of the noble metal catalyst component is less than 0.05% by weight based on the inner catalyst layer, the conversion rate at which the atmosphere of the catalyst reaction changes from the lean to the rich is lowered so that the catalytic decomposition activity of the catalyst is deteriorated.

According to the first invention, the noble metal catalyst component is supported on a known carrier material preferably such as alumina, silica, silica-alumina, zeolite or titania.

The inner layer catalyst component is prepared as follows, for example. A carrier material such as alumina is added to an aqueous solution of a water-soluble salt of noble metal catalyst component such as platinum to prepare a slurry. After the slurry is stirred and dried, the resultant product is calcined at a temperature of 500–900° C. in an oxidative or reducing atmosphere, thereby providing the inner layer catalyst component in the form of powder composed of the carrier supporting the noble metal catalyst component thereon.

Most preferably, the inner layer catalyst component is prepared as follows. The noble metal catalyst component is supported on a carrier material such as alumina by an ion-exchange method using an aqueous solution of an ion-exchangeable water-soluble salt of the noble metal catalyst component such as platinum, e.g., tetrammineplatinum (II) nitrate $(Pt(NH_3)_4(NO_3)_2$ or dinitrodiammineplatinum (II) $(Pt(NO_2)_2(NH_3)_2$, and the resulting product is then dried and calcined at a temperature of 500–900° C. in an oxidative or reducing atmosphere, thereby providing the inner layer catalyst component in the form of powder composed of the carrier supporting the noble metal catalyst component thereon.

The inner catalyst layer contains the inner layer catalyst component that has a high NOx reduction activity under the rich conditions and accordingly the influence of the thickness of the inner catalyst layer on the NOx reduction activity in the rich and lean excursions is not so significant as that of the outer catalyst layer. However, the inner catalyst layer has a thickness usually in the range from 10 μm to 50 μm. If the inner catalyst layer is more than 50 μm in thickness, the catalyst is not improved in the activity accordingly. On the other hand, when the inner catalyst layer is less than 10 μm in thickness, the catalyst is reduced in the NOx reduction activity.

The method and the catalyst for catalytic reduction of nitrogen oxides according to the second of the present inventions will now be described.

According to the second invention, the outer catalyst layer (A) of the catalyst comprises an outer layer catalyst component, and the outer layer catalyst component comprises a first catalyst component comprising:

(a) ceria or (b) praseodymium oxides or (c) at least one of a mixture or a composite oxide of at least two elements selected from cerium, zirconium, praseodymium, neodymium, gadolinium and lanthanum, and a second catalyst component comprising:

(d) at least one catalyst component selected from rhodium, palladium and their oxides.

On the other hand, the inner catalyst layer (B) comprises an inner layer catalyst component, and the inner layer catalyst component comprises:

(a) at least one catalyst component selected from platinum, rhodium, palladium and their oxides, (b) a co-catalyst comprising ions and/or oxides of at least one element selected from iron, cobalt and nickel, and (c) a carrier material.

According to the second invention, the outer catalyst layer contains the outer layer catalyst component in an amount of at least 50% by weight, preferably in an amount of at least 80% by weight. When the amount of the outer layer catalyst component is less than 50% by weight based on the outer catalyst layer, the oxygen storage capacity of the resulting outer catalyst layer is not sufficient to maintain the atmosphere of the inner catalyst layer reductive for the normal period of lean excursion (from one to two minutes), and as results, the NOx reduction ability of the catalyst on rhodium or palladium is deteriorated in the lean excursion, and furthermore, the resistance to SOx of the catalyst is deteriorated.

According to the second invention, the first catalyst component of the outer catalyst layer is promptly reduced over a short period of time of the rich excursion with the aid of high reducing ability of the second catalyst component of the outer catalyst layer as well as with the aid of the noble metal catalyst component of the inner catalyst layer such as platinum and the co-catalyst such as iron. That is, the oxides (for example, ceria) lose a part of their oxygen, and on the other hand, they store oxygen in the gas phase under the lean conditions. Thus, the first catalyst component of the outer catalyst layer functions as a material that is capable of storing oxygen (OSC material). In this way, the first catalyst component or the OSC material of the outer catalyst layer restrains the oxidation of the second catalyst component of the outer catalyst layer such as rhodium or palladium, thereby making it possible to proceed the reduction reaction of NOx on the noble metal catalyst component such as rhodium or palladium at high efficiency.

As mentioned above, according to the second invention, the first catalyst component that functions as the OSC material in the outer catalyst layer comprises:

(a) ceria or (b) praseodymium oxides or (c) at least one of a mixture or a composite oxide (solid solution) of at least two elements selected from cerium, zirconium, praseodymium, neodymium, gadolinium and lanthanum.

Like the first invention, it is preferred that the mixture is a uniform mixture. However, composite oxides of two or more of the elements above are more preferably used than the mixture. In particular, binary or ternary composite oxides or solid solutions are preferred.

In the case of binary composite oxides, for example, ceria/zirconia composite oxide or ceria/praseodymium oxide composite oxide, the weight ratio in terms of oxides of the elements in the composite oxides is preferably in the range of 80/20 to 60/40. In turn, in the case of ternary composite oxides, for example, ceria/praseodymium oxide/zirconia composite oxides, ceria/zirconia/gadolinium oxide composite oxide, ceria/zirconia/lanthanum oxide composite oxides or ceria/zirconia/neodymium oxide composite oxides, the weight ratio in terms of oxides of the elements in the composite oxides is preferably in the range of 45/30/30 to 75/20/5. The weight ratio in terms of oxides in the composite oxides is calculated provided that ceria, zirconia, praseodymium oxides, neodymium oxides, gadolinium oxides and lanthanum oxides are represented by $CeO_2$, $ZrO_2$, $Pr_6O_{11}$, $Nd_2O_3$, $Ga_2O_3$ and $La_2O_3$, respectively.

According to the second invention, the outer catalyst layer contains the second catalyst component in addition to the above-mentioned first catalyst component. The second catalyst component is the same as the second catalyst component in the second catalyst component in the outer catalyst layer of the first invention with respect to the composition, function and thickness. Furthermore, the outer layer catalyst component of the outer catalyst layer is prepared in the same manner as the outer catalyst component of the outer catalyst layer of the first invention.

Thus, according to the second invention, the outer catalyst layer contains the second catalyst component that comprises at least one selected from rhodium, palladium and their oxides in addition to the first catalyst component mentioned above, and it is preferred that the second catalyst component is supported on the first catalyst component or the OSC material. According to the invention, the second catalyst component is contained in an amount of 0.05–3% by weight bases on the catalyst components of the outer catalyst layer.

The second catalyst component accelerates the reduction of OSC material under the rich conditions, and at the same time, the second catalyst component is reduced so as to function as active species of the NOx decomposition reaction and has a role to reduce and decompose NOx promptly under the lean conditions.

In the second invention, the thickness of the outer catalyst layer has a great influence on the NOx reduction activity of the catalyst in the rich/lean excursions and the resistance to SOx of the catalyst. The optimum thickness of the outer catalyst layer depends on the reaction conditions such as temperature, oxygen concentration or space velocity under which the reaction is carried out, however, it is generally preferred that the thickness of outer catalyst layer is in the range of 20 µm to 80 µm so that the catalyst is highly active in the catalytic reduction of NOx in the rich/lean excursions, and most preferably it is about 40 µm. If the outer catalyst layer is more than 80 µm in thickness, the catalyst is not improved in the activity accordingly, and on the contrary, it is deteriorated. On the other hand, if the outer catalyst layer is less than 20 µm in thickness, NOx is oxidized on the inner catalyst layer under the lean conditions so that the catalyst activity is deteriorated. The thickness of catalyst layer may be calculated from the amount of the catalyst containing slurry coated on a substrate assuming that for purpose of convenience the catalyst layer has an apparent density of 1.0 g/cm$^3$.

The outer layer catalyst component of the outer catalyst layer in the second invention is obtained, for example, by methods as follows. First, an aqueous solution of water-soluble salt of the element such as cerium that forms the first catalyst component, for example, as nitrate, is neutralized or heated and hydrolyzed to form a hydroxide, and the hydroxide is then calcined at a temperature of 300–900° C. under an oxidative or reducing atmosphere thereby providing the first catalyst component. However, the first catalyst component is also obtained by calcining oxides or hydroxides of cerium available on the market. Then, an aqueous solution of water-soluble salt of the element that forms the second catalyst component, for example, such as nitrate, is supported on the first catalyst component by a known suitable method such as an impregnation method or an ion exchange method, and the resulting product is calcined at a temperature of 500–900° C. under an oxidative or reducing atmosphere thereby providing the outer layer catalyst component as powder which comprises the first catalyst component and the second catalyst component.

According to the second of the present invention, nitrogen oxides are reduced in the rich excursion or under the reducing conditions in such a manner as follows. The noble metal catalyst component of the inner catalyst layer and the noble metal catalyst component of the outer catalyst layer that have been oxidized in the lean excursion are reduced in the rich excursion and thus NOx is catalytically decomposed on these noble metal catalyst components, and furthermore, the co-catalyst in the inner catalyst layer accelerates the reductive decomposition of NOx on the above-mentioned noble metal catalyst component. In addition, since oxygen is reduced promptly with the reducing agent on the noble metal catalyst component in the inner catalyst layer among the noble metal catalyst components in the inner catalyst layer and the outer catalyst layer, the oxygen of the first catalyst component of the outer catalyst layer or the OSC material "spills over" into the inner catalyst layer, and as results, the OSC material is reduced in part efficiently together with the second catalyst component of the outer catalyst layer. That is, the OSC material is regenerated so that it works in the subsequent lean excursion.

In the lean excursion, i.e., under the oxidizing conditions following the rich excursion, nitrogen oxides are reduced in such a manner as follows. The oxygen that has diffused into the outer catalyst layer in the lean excursion is stored in the first catalyst component or the OSC material of the outer catalyst layer so that the reaction atmosphere around the second catalyst component of the outer catalyst layer is kept rich or stoichiometric, and accordingly, NOx is catalytically decomposed promptly on the second catalyst component of the outer catalyst layer even under the lean conditions.

Furthermore, according to the second invention, SOx is trapped on the outer catalyst layer and then it is detached and released therefrom in the rich excursion. That is, SOx is rarely adsorbed on the co-catalyst in the inner catalyst layer. Consequently, the deterioration of the catalyst caused by SOx is much less than than the NOx storage-reduction system mentioned hereinbefore. Besides, there is substantially no deterioration of the outer catalyst because of the reason mentioned above so that if the catalyst of the invention is used in the presence of SOx, there takes place substantially no deterioration of the catalyst. The NOx adsorbed under the lean conditions is readily regenerated under the rich conditions.

According to the second of the present inventions, the inner catalyst layer contains the inner layer catalyst component at least in an amount of 50% by weight, preferably in an amount of 80% by weight. When the amount of the inner layer catalyst component in the inner catalyst layer is less than 50% by weight, the inner catalyst layer is decreased in the NOx catalytic reduction activity under the rich conditions as well as in the effect of aiding the reduction of the noble metal catalyst component and the OSC material of the catalyst layer.

According to the second invention, the inner catalyst layer contains the inner layer catalyst component which comprises at least one noble metal catalyst component selected from platinum, rhodium, palladium and their oxides, a co-catalyst and a carrier material. The inner catalyst layer contains the noble metal catalyst component in an amount of in the range of 0.05–5% by weight in terms of metals. If the amount of the noble metal catalyst component is more than 5% by weight based on the inner catalyst layer, the reactivity of NOx and reducing agent under the rich conditions is not improved. On the other hand, when the amount of the noble metal catalyst component is less than 0.05% by weight based on the inner catalyst layer, the conversion rate at which the atmosphere of the catalyst reaction changes from the lean to the rich is lowered so that the catalytic decomposition activity of the catalyst is lowered.

According to the second invention, the noble metal catalyst component is supported on a known carrier material preferably such as alumina, silica, silica-alumina, zeolite or titania. At least some part of the co-catalyst may also be supported on such a carrier material. In this case, the co-catalyst is supported on a carrier material in an amount ranging from 1 to 5% by weight in terms of metals based on the amount of the total of the carrier material and the co-catalyst supported thereon. When the amount of the co-catalyst supported on the carrier material is less than 1% by weight, the co-catalyst is poor in enhancing the NOx catalytic decomposition activity of the noble metal catalyst component in the inne catalyst layer under the rich conditions. However, if the amount of the co-catalyst supported on the carrier material is more than 5% by weight, there is found no additional effect accordingly.

According to the second invention, the noble metal catalyst component and at least part of the co-catalyst may be supported on a carrier material. The noble metal catalyst component may also be supported on the co-catalyst. The proportion of the carrier material that supports only the catalyst component is usually in the range of 0–90%, although the proportion is not specifically limited to this range.

When a co-catalyst is to be supported on a carrier material that has ion exchange ability, ions of at least one element selected from iron, cobalt and nickel are supported on such a carrier material. However, in this case, it is not desirable to support the ions on the carrier material in an amount of more than 1% by weight based on the amount of the total of the carrier material and the ions supported thereon since it is liable that the element is supported as a mixture of the ions and oxides on account of the fact that the element is limited more or less in its ion exchange ability.

According to the second invention, the co-catalyst in the inner catalyst layer so functions as to improve the response to reaction of the noble metal catalyst component such as platinum under the rich conditions so that the noble metal catalyst component is reduced promptly. The inner catalyst layer contains the co-catalyst usually in an amount of 1–10% by weight. When the amount of the co-catalyst is less than 1% by weight in the inner catalyst layer, the NOx absorption ability of the inner catalyst layer under the lean conditions is deteriorated, whereas when the amount of the co-catalyst is more than 10% by weight, the NOx reduction ability of the noble metal catalyst component of the inner catalyst layer is deteriorated.

The inner layer catalyst component is prepared as follows, for example. First, a co-catalyst component such as iron is supported on a carrier material such as alumina by suitable methods such as an impregnation method or an ion exchange method, and is then further mixed with a carrier material such as alumina to prepare a mixture. The mixture is then added to an aqueous solution of a water-solution salt of a noble metal catalyst component such as platinum and mixed and stirred to prepare a slurry. The slurry is dried and calcined at a temperature of 500–900° C. under an oxidative or reducing atmosphere thereby providing the inner layer catalyst component as powder, which is composed of a mixture of a carried material supporting the co-catalyst and the noble metal catalyst component thereon and a carried material supporting the noble metal catalyst component thereon.

As a further method, first, a co-catalyst component such as iron is supported on a carrier material such as alumina by suitable methods such as an impregnation method or an ion exchange method, and the resulting product is then added to an aqueous solution of a water-solution salt of a noble metal catalyst component such as platinum and mixed and stirred to prepare a slurry. The slurry is dried and calcined at a temperature of 500–900° C. under an oxidative or reducing atmosphere thereby providing the inner layer catalyst component as powder, which is composed of a carried material supporting the co-catalyst and the noble metal catalyst component thereon.

If necessary, a powder composed of a carrier material such as alumina supporting a co-catalyst component thereon and a powder composed of a carrier material such as alumina supporting a noble metal catalyst component thereon are prepared respectively in manners as mentioned above, and the powders are mixed together thereby providing an inner layer catalyst component as powder.

According to the second invention, the inner catalyst layer contains the inner layer catalyst component that has a high NOx reduction activity under the rich conditions and accordingly the influence of the thickness of the inner catalyst layer on the NOx reduction activity in the rich and lean excursions is not so significant as that of the outer catalyst layer. However, the inner catalyst layer has a thickness usually in the range from 10 µm to 50 µm. If the inner catalyst layer is more than 50 µm in thickness, the catalyst is not improved in the activity accordingly. On the other hand, when the inner catalyst layer is less than 10 µm in thickness, the catalyst is reduced in the NOx reduction activity.

Any of the catalyst components used in the outer or inner catalyst layer either of the first or the second of the present inventions is obtained in various shapes such as powder or particles. Accordingly, a catalysts structure of any shape may be obtained by molding the inner layer catalyst component into any shape such as honeycomb, annular or spherical shapes by any of hitherto well known methods, and then by forming the outer catalyst layer thereon by using the outer layer catalyst component. If desired, any additives, such as molding additives, reinforcements, inorganic fibers or organic binders may be used when the catalyst structure is prepared.

The catalyst of the invention may advantageously be used as a catalyst structure that is composed of an inactive substrate of any desired shape having an inner catalyst layer prepared by a wash-coating method, for example, by coating the inner layer catalyst component on the surface of the substrate and by forming an outer catalyst layer by coating the outer layer catalyst component on the inner catalyst layer. The inactive substrate may be composed of, for example, a clay mineral such as cordierite or a metal such as stainless steel, preferably of heat-resistant, such as a Fe—Cr—Al steel, and may be in the form of honeycomb, annular or spherical structures.

The catalyst of the invention, either the first or the second, is excellent in resistance to sulfur oxides as well as resistance to heat. Therefore, it is suitable for use as, for example, a catalyst for the reduction of nitrogen oxides or for the denitrization of exhaust gases from diesel engines or exhaust gases from lean gasoline automobile engines.

The catalyst of the invention is preferably used in the catalytic reaction between under the combustion atmosphere of fuel which oscillates between the rich and lean conditions. The period of the catalytic reaction (i.e., the interval between the rich atmosphere (or the lean atmosphere) and the subsequent rich atmosphere (or the lean atmosphere) is preferably 5–150 seconds, more preferably 30–90 seconds, and the rich/lean time span, that is, the time under the rich conditions (seconds)/the time under the lean conditions (seconds) is usually between 0.5/5 and 10/150, more preferably between 2/30 and 5/90.

The rich conditions are normally prepared by periodically injecting fuel into a combustion chamber of an engine at an air/fuel weight ratio of 10–14 in case of using gasoline as fuel. The typical exhaust gases under the rich conditions contain several hundred volume ppm of NOx, 5–6% by volume of water, 2–3% by volume of CO, 2–3% by volume of hydrogen, several thousands volume ppm of hydrocarbons and 0–0.5% by volume of oxygen.

In turn, the lean conditions are normally prepared by periodically injecting fuel into a combustion chamber of an engine at an air/fuel weight ratio of 20–40 in case of using gasoline as fuel. The typical exhaust gases under the lean conditions contain several hundred volume ppm of NOx, 5–6% by volume of water, several thousands volume ppm of CO, several thousands volume ppm of hydrogen, several thousand volume ppm of hydrocarbons and 5–10% by volume of oxygen.

The temperature at which the catalytic reduction of NOx is carried out using the catalyst of the invention is usually in the range of 150–550° C., preferably in the range of 200–500° C., so that the catalyst has an effective catalyst activity for the reduction of NOx over a long period of time in the rich excursion, although it depends on the exhaust gases to be reacted. Within the above recited temperature range of the reaction, the exhaust gases are treated preferably at a space velocity of 5,000–100,000 $h^{-1}$.

According to the method of the invention, NOx containing exhaust gases are contacted with the catalyst described above in the periodic rich/lean excursions so that the NOx is catalytically reduced in a stable and efficient manner even in the presence of oxygen, sulfur oxides or moisture.

EXAMPLES

The invention is now illustrated in greater detail with reference to examples of preparation of the powder catalysts for use as the inner layer catalyst component or the outer layer catalyst component, as well as examples of preparation of honeycomb catalyst structures using the powder catalyst and examples of catalytic activity of the thus prepared catalyst structures; however, it should be understood that the invention is not deemed to be limited thereto. All the parts, percentages, and ratios are by weight unless otherwise indicated. In the preparation of honeycomb catalyst structures, the thickness of the catalyst layer was calculated with the assumption that the apparent density of the layer is 1.0 g/cm³ and the geometric specific surface area of the honeycomb is 2500 m²/g.

I. EXAMPLES OF THE FIRST INVENTION (1) Preparation of the Inner Layer Catalyst Components Preparation Example 1

8.40 g of $Pt(NH_3)_4(NO_3)_2$ solution (9.0% as platinum) was added to 100 ml of ion-exchanged water to prepare a solution. 60 g of γ-alumina (KC-501 available from Sumitomo Kagaku Kogyo K. K.) was added to the solution, followed by drying at 100° C. with agitation and calcining at 500° C. for 3 hours in the air to provide a powder catalyst composed of γ-alumina supporting 1% of platinum thereon.

Preparation Example 2

8.40 g of $(Pt(NH_3)_4(NO_3)_2$ solution (9.0% as platinum) and 4.20 g of rhodium nitrate solution (9.0% as rhodium) were added to 100 ml of ion-exchanged water to prepare a solution. 60 g of γ-alumina (KC-501 available from Sumitomo Kagaku Kogyo K. K.) was added to the solution, followed by drying at 100° C. with agitation and calcining at 500° C. for 3 hours in the air to provide a powder catalyst composed of γ-alumina supporting 1% of platinum and 0.5% of rhodium thereon.

Preparation Example 3

4.20 g of palladium nitrate solution (9.0% as palladium) and 8.40 g of $Pt(NH_3)_4(NO_3)_2$ solution (9.0% as platinum) were added to 100 ml of ion-exchanged water to prepare a solution. 60 g of γ-alumina (KC-501 available from Sumitomo Kagaku Kogyo K. K.) was added to the solution, followed by drying at 100° C. with agitation and calcining at 500° C. for 3 hours in the air to provide a powder catalyst composed of γ-alumina supporting 1% of platinum and 0.5% of palladium thereon.

(2) Preparation of Outer Layer Catalyst Components

Preparation Example 4

151.37 g of cerium nitrate $(Ce(NO_3)_3.6H_2O)$, 32.09 g of zirconium oxynitrate $(ZrO(NO_3)_2)$ and 21.41 g of gadolinium nitrate $Gd(NO_3)_3.6H_2O)$ were dissolved in 100 ml of ion-exchanged water to prepare a solution. 0.1N ammonium hydroxide solution was added to the solution to neutralize and hydrolyze the cerium salt, zirconium salt and gadolinium salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/gadolinium oxide composite oxide (having an oxide weight ratio of 70/20/10 and a specific surface area of 182 m²/g).

4.20 g of rhodium nitrate solution (9.0% as rhodium) was added to 100 ml of ion-exchanged water to prepare a solution. 30 g of the ceria/zirconia/gadolinium oxide composite oxide was added to the solution, followed by drying at 100° C. with agitation and calcining at 500° C. for 3 hours in the air to provide a powder catalyst composed of ceria/zirconia/gadolinium oxide composite oxide supporting 1% of powder of rhodium thereon.

Preparation Example 5

103.77 g of cerium nitrate $(Ce(NO_3)_3.6H_2O)$ and 40.96 g of terbium nitrate $Tb(NO_3)_3.6H_2O$ were dissolved in 100 ml of ion-exchanged water to prepare a solution. 0.1N ammonium hydroxide solution was added to the solution to neutralize and hydrolyze the cerium salt and terbium salt, followed by ageing for one hour. The resulting slurry was filtered to collect the resulting products, and the products were dried at 120° C. for 24 hours. The dried product was then calcined in the air at 500° C. for three hours, thereby providing ceria/terbium oxide composite oxide (having an oxide weight ratio of 70/30 and a specific surface area of 189 m²/g).

2.10 g of rhodium nitrate solution (9.0% as rhodium) was added to 100 ml of ion-exchanged water to prepare a solution. 30 g of the ceria/terbium oxide composite oxide was added to the solution, followed by drying at 100° C. with agitation and calcining at 500° C. for 3 hours in the air to provide a powder catalyst composed of powder of ceria/terbium oxide composite oxide supporting 0.5% of rhodium thereon.

Preparation Example 6

34.59 g of cerium nitrate (Ce(NO$_3$)$_3$.6H$_2$O), 84.45 g of zirconium oxynitrate (ZrO(NO$_3$)$_2$) and 7.97 g of lanthanum nitrate La(NO$_3$)$_3$.6H$_2$O) were dissolved in 1700 ml of ion-exchanged water to prepare a solution. 0.1N ammonium hydroxide solution was added to the solution to neutralize and hydrolyze the cerium salt, zirconium salt and lanthanum salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/lanthanum oxide composite oxide (having an oxide weight ratio of 22/73/5 and a specific surface area of 80 m$^2$/g.)

2.10 g of rhodium nitrate solution (9.0% as rhodium) was added to 100 ml of ion-exchanged water to prepare a solution. 30 g of the ceria/zirconia/lanthanum oxide composite oxide was added to the solution, followed by drying at 100° C. with agitation and calcining at 500° C. for 3 hours in the air to provide a powder catalyst composed of powder of ceria/zirconia/lanthanum oxide composite oxide supporting 0.5% of rhodium thereon.

Preparation Example 7

121.06 g of cerium nitrate (Ce(NO$_3$)$_3$.6H$_2$O), 28.12 g of zirconium oxynitrate (ZrO(NO$_3$)$_2$) and 3.40 g of samarium nitrate Sm(NO$_3$)$_3$.6H$_2$O) were dissolved in 1700 ml of ion-exchanged water to prepare a solution. 0.1N ammonium hydroxide solution was added to the solution to neutralize and hydrolyze the cerium salt, zirconium salt and samarium salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/samarium oxide composite oxide (having an oxide weight ratio of 72/24/4 and a specific surface area of 187 m$^2$/g).

2.10 g of rhodium nitrate solution (9.0% as rhodium) was added to 100 ml of ion-exchanged water to prepare a solution. 30 g of the ceria/zirconia/samarium oxide composite oxide was added to the solution, followed by drying at 100° C. with agitation and calcining at 500° C. for 3 hours in the air to provide a powder catalyst composed of powder of ceria/zirconia/samarium oxide composite oxide supporting 0.5% of rhodium thereon.

(3) Preparation of Honeycomb Catalyst Structures

Example 1

30 g of the powder catalyst composed of γ-alumina supporting 1% of platinum thereon prepared in Preparation Example 1 was mixed with 3 g of silica sol (Snowtex N available from Nissan Kagaku Kogyo K.K., 20% by weight concentration in terms of silica) and an appropriate amount of water. The mixture was ground with a planetary mill for five minutes using 50 g of zirconia balls as grinding media to prepare a wash coating slurry. A cordierite honeycomb substrate which had a cell number of 400 per square inch was coated with the slurry to provide a honeycomb structure having an inner catalyst layer composed of the powder catalyst on the surface and having a thickness of 30 μm.

30 g of the powder catalyst composed of ceria/zirconia/gadolinium oxide composite oxide supporting 1% of rhodium thereon prepared in Preparation Example 4 was mixed with 3 g of silica sol (Snowtex N available from Nissan Kagaku Kogyo K.K., 20% by weight concentration in terms of silica) and an appropriate amount of water. Using the mixture, a slurry was prepared in the same manner as above. The slurry was then coated on the inner catalyst layer to provide a honeycomb catalyst structure having an outer catalyst layer composed of ceria/zirconia/gadolinium oxide composite oxide supporting 1% of rhodium thereon and having a thickness of 60 μm.

Example 2

In the same manner as Example 1, there was prepared a honeycomb catalyst structure having an inner catalyst layer composed of γ-alumina supporting 1% of platinum thereon prepared in Preparation Example 1 and having a thickness of 30 μm and an outer catalyst layer composed of ceria/terbium oxide composite oxide (having an oxide weight ratio of 70/30) supporting 0.5% of rhodium thereon prepared in Preparation Example 5 and having a thickness of 60 μm.

Example 3

In the same manner as Example 1, there was prepared a honeycomb catalyst structure having an inner catalyst layer composed of γ-alumina supporting 1% of platinum and 0.5% of rhodium thereon prepared in Preparation Example 2 and having a thickness of 30 μm and an outer catalyst layer composed of ceria/zirconium/lanthanum oxide composite oxide (having an oxide weight ratio of 22/73/5) supporting 0.5% of rhodium thereon prepared in Preparation Example 6 and having a thickness of 60 μm.

Example 4

In the same manner as Example 1, there was prepared a honeycomb catalyst structure having an inner catalyst layer composed of γ-alumina supporting 1% of platinum and 0.5% of palladium thereon prepared in Preparation Example 3 and having a thickness of 30 μm and an outer catalyst layer composed of ceria/zirconium/samarium oxide composite oxide (having an oxide weight ratio of 72/24/4) supporting 0.5% of rhodium thereon prepared in Preparation Example 7 and having a thickness of 60 μm.

Comparative Example 1

151.37 g of cerium nitrate (Ce(NO$_3$)$_3$.6H$_2$O) was dissolved in 100 ml of ion-exchanged water to prepare a solution. 0.1N ammonium hydroxide solution was added to the solution to neutralize and hydrolyze the cerium salt, followed by ageing for one hour. The resulting slurry was filtered to collect the resulting products, and the product was dried at 120° C. for 24 hours. The dried product was then calcined in the air at 500° C. for three hours, thereby providing ceria powder (having a specific surface area of 188 m$^2$/g).

15 g of the ceria powder and 15 g of γ-alumina (KC-501 available from Sumitomo Kagaku Kogyo K. K.) were dry mixed to prepare a mixture, and 1% of platinum was supported on the mixture. Using 30 g of the resulting powder catalyst, a wash coating slurry was prepared in the same manner as Example 1. The slurry was then coated on the same cordierite honeycomb substrate as used in Example 1 in the same manner as Example 1 thereby providing a honeycomb catalyst structure having a layer of the catalyst on the surface 60 μm in thickness.

Comparative Example 2

Barium carbonate ($BaCO_3$) was prepared by using solutions of barium hydroxide and sodium carbonate. The barium carbonate and γ-alumina (KC-501 available from Sumitomo Kagaku Kogyo K. K.) were mixed together in a weight ratio of 8 to 2, and 1% of platinum was supported on the mixture to prepare a catalyst powder.

γ-Alumina (KC-501 available from Sumitomo Kagaku Kogyo K. K.) was added to an aqueous solution of potassium carbonate, and the resulting mixture was dried and calcined at 1100° C. for three hours in the air to provide $K_2O.12Al_2O_3$ (having a specific surface area of 18 $m^2/g$).

Furthermore, γ-alumina (KC-501 available from Sumitomo Kagaku Kogyo K. K.) was mixed with $K_2O.12Al_2O_3$ prepared above in a weight ratio of 9 to 1, and 1% of platinum was supported on the mixture thereby providing a catalyst powder.

48 g of catalyst powder composed of $BaCO_3$/γ-alumina supporting 1% of platinum thereon and 12 g of catalyst powder composed of γ-alumina/$K_2O.12Al_2O_3$ supporting 1% of platinum thereon were dry mixed, and using this mixture, a wash coating slurry was prepared in the same manner as Example 1. The slurry was then coated on the same cordierite honeycomb substrate as used in Example 1 in the same manner as Example 1 thereby providing a honeycomb catalyst structure having a layer of the catalyst on the surface 80 μm in thickness.

(4) Performance Tests

Using each of the catalyst structures prepared in the Examples and the Comparative Examples as described above, a nitrogen oxide containing gas was treated under the conditions below. The conversion of nitrogen oxides to nitrogen was determined by a chemical luminescence method.

Test Methods:

The gas mixture used in the NOx reduction experiment under the rich conditions was composed of:
NO: 500 ppm
$SO_2$: 20 ppm
$O_2$: 0.4%
CO: 2%
$C_3H_6$ (propylene): 2000 ppm
$H_2$: 2%
$H_2O$: 6.0%

The gas mixture used under the lean conditions was prepared by injecting oxygen into the gas mixture used under the rich conditions and was composed of:
NO: 500 ppm
$SO_2$: 20 ppm
$O_2$: 9.0%
CO: 0.2%
$C_3H_6$ (propylene): 500 ppm
$H_2$: 0%
$H_2O$: 6.0%

The performance of the catalysts was examined in the catalytic reaction with an oscillation between under the rich and the lean conditions. The ratio of rich/lean time spans were adjusted to be in the range from 3/30 (s/s) to 12/120 (s/s).

(i) Space Velocity:
70,000 $h^{-1}$ (under the lean conditions)
70,000 $h^{-1}$ (under the rich conditions).

(ii) Reaction Temperature:
250, 300, 350, 400, 450 and 500° C.

The results are shown in the Table 1. As is apparent from the Table 1, the catalysts of the invention achieve high conversion of nitrogen oxides, whereas the catalysts according to Comparative Examples have on the whole a low conversion rate of nitrogen oxides.

TABLE 1

| | | Nox Removal Rate (%) Temperature (° C.) | | | | | | |
|---|---|---|---|---|---|---|---|---|
| | | 200 | 250 | 300 | 350 | 400 | 450 | 500 |
| Example 1 | 3/30 | 90.4 | 96.6 | 98.1 | 97.5 | 95.4 | 91.4 | 82.5 |
| | 6/60 | 88.3 | 95.9 | 96.8 | 96.4 | 94.0 | 91.8 | 81.7 |
| | 12/120 | 80.7 | 83.5 | 85.8 | 85.1 | 77.0 | 72.4 | 52.7 |
| Example 2 | 6/60 | 85.8 | 92.9 | 96.3 | 98.7 | 96.5 | 94.3 | 85.2 |
| Example 3 | 6/60 | 79.5 | 88.8 | 91.7 | 92.9 | 90.7 | 84.6 | 74.5 |
| Example 4 | 6/60 | 88.6 | 95.1 | 95.8 | 96.5 | 95.3 | 89.2 | 79.5 |
| Comparative Example 1 | 6/60 | 79.7 | 91.5 | 93.3 | 92.8 | 91.8 | 81.3 | 69.6 |
| Comparative Example 2 | | 74.2 | 84.1 | 93.8 | 95.7 | 95.9 | 92.7 | 90.5 |

Furthermore, using each of the catalyst structures prepared in Example 1, Comparative Examples 1 and 2, catalyst durability tests were carried out under the same gas conditions at a temperature of 350° C. with a rich/lean span of 55/5 (s/s). As clear from the results shown in Table 2, the catalyst of the invention has much higher resistance to sulfur oxides than the known NOx storage reduction system.

TABLE 2

| | Nox Removal Rate (%) Running Time (h) | | | | | |
|---|---|---|---|---|---|---|
| | 0 | 10 | 20 | 30 | 40 | 50 |
| Example 1 | 96.8 | 96.8 | 96.5 | 96.6 | 96.5 | 96.4 |
| Comparative Example 1 | 93.3 | 42.7 | 29.6 | 17.0 | 8.0 | 4.5 |
| Comparative Example 2 | 95.7 | 42.9 | 11.8 | 4.6 | 3.5 | 2.6 |

II. THE SECOND INVENTION (1) Preparation of Inner Layer Catalyst Components

Preparation Example 1

7.23 g of ferric nitrate ($Fe(NO_3)_3.9H_2O$) was dissolved in 50 ml of ion-exchanged water to prepare a solution. 20 g of γ-alumina (KC-501 available from Sumitomo Kagaku Kogyo K. K.) was added to the solution, followed by drying at 100° C. with agitation and calcining at 500° C. for 3 hours in the air to provide a powder composed of γ-alumina supporting 5% of iron thereon. Most of the iron supported on γ-alumina was found in the form of ferric oxide.

8.40 g of $Pt(NH_3)_4(NO_3)_2$ solution (9.0% as platinum) was added to 100 ml of ion-exchanged water to prepare a solution. 40 g of γ-alumina (KC-501 available from Sumitomo Kagaku Kogyo K. K.) and 20 g of the above-mentioned powder composed of γ-alumina supporting 5% of iron thereon were added to the solution, followed by drying at 100° C. with agitation and calcining at 500° C. for 3 hours in the air to provide a powder catalyst that was composed of a mixture of γ-alumina and γ-alumina supporting 5% of iron thereon (in a weight ratio of 2/1) and 1% of platinum supported on the mixture.

Preparation Example 2

2.17 g of ferric nitrate (Fe(NO$_3$)$_3$.9H$_2$O) was dissolved in 50 ml of ion-exchanged water to prepare a solution. 30 g of γ-alumina (KC-501 available from Sumitomo Kagaku Kogyo K.K.) was added to the solution, followed by drying at 100° C. with agitation and calcining at 500° C. for 3 hours in the air to provide a powder composed of γ-alumina supporting 1% of iron thereon. Most of the iron supported on γ-alumina was found in the form of ferric ions.

8.40 g of Pt(NH$_3$)$_4$(NO$_3$)$_2$ solution (9.0% as platinum) was added to 100 ml of ion-exchanged water to prepare a solution. 30 g of γ-alumina (KC-501 available from Sumitomo Kagaku Kogyo K.K.) and 30 g of the above-mentioned powder composed of γ-alumina supporting 1% of iron thereon were added to the solution, followed by drying at 100° C. with agitation and calcining at 500° C. for 3 hours in the air to provide a powder catalyst that was composed of a mixture of γ-alumina and γ-alumina supporting 1% of iron thereon (in a weight ratio of 1/1) and 1% of platinum supported on the mixture.

Preparation Example 3

1.48 g of cobaltic nitrate (Co(NO$_3$)$_3$.6H$_2$O) was dissolved in 50 ml of ion-exchanged water to prepare a solution. 30 g of γ-alumina (KC-501 available from Sumitomo Kagaku Kogyo K.K.) was added to the solution, followed by drying at 100° C. with agitation and calcining at 500° C. for 3 hours in the air to provide a powder composed of γ-alumina supporting 1% of cobalt thereon. Most of the cobalt supported on γ-alumina was found in the form of cabaltic ions.

4.20 g of rhodium nitrate solution (9.0% as rhodium) and 8.40 g of Pt(NH$_3$)$_4$(NO$_3$)$_2$ solution (9.0% as platinum) were added to 100 ml of ion-exchanged water to prepare a solution. 30 g of γ-alumina (KC-501 available from Sumitomo Kagaku Kogyo K.K.) and 30 g of the above-mentioned powder composed of γ-alumina supporting 1% of cobalt thereon were added to the solution, followed by drying at 100° C. with agitation and calcining at 500° C. for 3 hours in the air to provide a powder catalyst that was composed of a mixture of γ-alumina and γ-alumina supporting 1% of cobalt thereon (in a weight ratio of 1/1) and 1% of platinum and 0.5% of rhodium supported on the mixture.

Preparation Example 4

1.46 g of nickel nitrate (Ni(NO$_3$)$_3$.6H$_2$O) was dissolved in 50 ml of ion-exchanged water to prepare a solution. 30 g of γ-alumina (KC-0.501 available from Sumitomo Kagaku Kogyo K.K.) was added to the solution, followed by drying at 100° C. with agitation and calcining at 500° C. for 3 hours in the air to provide a powder composed of γ-alumina supporting 1% of nickel thereon. Most of the nickel supported on γ-alumina was found in the form of nickel (III) ions.

4.20 g of palladium nitrate solution (9.0% as rhodium) and 8.40 g of Pt(NH$_3$)$_4$(NO$_3$)$_2$ solution (9.0% as platinum) were added to 100 ml of ion-exchanged water to prepare a solution. 30 g of γ-alumina (KC-501 available from Sumitomo Kagaku Kogyo K.K.) and 30 g of the above-mentioned powder composed of γ-alumina supporting 1% of nickel thereon were added to the solution, followed by drying at 100° C. with agitation and calcining at 500° C. for 3 hours in the air to provide a powder catalyst that was composed of a mixture of γ-alumina and γ-alumina supporting 1% of nickel thereon (in a weight ratio of 1/1) and 1% of platinum and 0.5% of palladium supported on the mixture.

(2) Preparation of Outer Layer Catalyst Components

Preparation Example 5

151.37 g of cerium nitrate (Ce(NO$_3$)$_3$.6H$_2$O) was dissolved in 100 ml of ion-exchanged water to prepare a solution. 0.1N ammonium hydroxide solution was added to the solution to neutralize and hydrolyze the cerium salt, followed by ageing for one hour. The resulting slurry was filtered to collect the resulting products, and the product was dried at 120° C. for 24 hours. The dried product was then calcined in the air at 500° C. for three hours, thereby providing ceria powder (having a specific surface area of 138 m$^2$/g).

4.20 g of rhodium nitrate solution (9.0% as rhodium) was added to 100 ml of ion-exchanged water to prepare a solution. 30 g of the ceria powder was added to the solution, followed by drying at 100° C. with agitation and calcining at 500° C. for 3 hours in the air to provide a powder catalyst composed of ceria supporting 1% of rhodium thereon.

Preparation Example 6

103.77 g of cerium nitrate (Ce(NO$_3$)$_3$.6H$_2$O) and 35.77 g of praseodymium nitrate (Pr(NO$_3$)$_3$.6H$_2$O) were dissolved in 100 ml of ion-exchanged water to prepare a solution. 0.1N ammonium hydroxide solution was added to the solution to neutralize and hydrolyze the cerium salt and praseodymium salt, followed by ageing for one hour. The resulting slurry was filtered to collect the resulting products, and the product was dried at 120° C. for 24 hours. The dried product was then calcined in the air at 500° C. for three hours, thereby providing ceria/praseodymium oxide composite oxide powder (having an oxide weight ratio of 60/40 and having a specific surface area of 112 m$^2$/g).

0.84 g of rhodium nitrate solution (9.0% as rhodium) was added to 100 ml of ion-exchanged water to prepare a solution. 30 g of the ceria/praseodymium oxide composite oxide was added to the solution, followed by drying at 100° C. with agitation and calcining at 500° C. for 3 hours in the air to provide a powder catalyst composed of ceria/praseodymium oxide composite oxide supporting 0.2% of rhodium thereon.

Preparation Example 7

34.59 g of cerium nitrate (Ce(NO$_3$)$_3$.6H$_2$O), 84.45 g of oxyzirconium nitrate (ZrO(NO$_3$)$_2$) and 7.97 g of lanthanum nitrate (La(NO$_3$)$_3$.6H$_2$O) were dissolved in 1700 ml of ion-exchanged water to prepare a solution. 0.1N ammonium hydroxide solution was added to the solution to neutralize and hydrolyze the cerium salt, zirconium salt and lanthanum salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/lanthanum oxide composite oxide powder (having an oxide weight ratio of 22/73/5 and having a specific surface area of 80 m$^2$/g).

2.10 g of rhodium nitrate solution (9.0% as rhodium) was added to 100 ml of ion-exchanged water to prepare a solution. 30 g of the ceria/zirconia/lanthanum oxide composite oxide powder was added to the solution, followed by drying at 100° C. with agitation and calcining at 500° C. for 3 hours in the air to provide a powder catalyst composed of ceria/zirconia/lanthanum oxide composite oxide supporting 0.5% of rhodium thereon.

Preparation Example 8

121.06 g of cerium nitrate ($Ce(NO_3)_3 \cdot 6H_2O$), 28.12 g of oxyzirconium nitrate ($ZrO(NO_3)_2$) and 7.48 g of gadolinium nitrate ($Ga(NO_3)_3 \cdot 6H_2O$) were dissolved in 1700 ml of ion-exchanged water to prepare a solution. 0.1N ammonium hydroxide solution was added to the solution to neutralize and hydrolyze the cerium salt, zirconium salt and lanthanum salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/gadolinium oxide composite oxide powder (having an oxide weight ratio of 72/24/4 and having a specific surface area of 198 $m^2/g$).

2.10 g of rhodium nitrate solution (9.0% as rhodium) was added to 100 ml of ion-exchanged water to prepare a solution. 30 g of the ceria/zirconia/gadolinium oxide composite oxide powder was added to the solution, followed by drying at 100° C. with agitation and calcining at 500° C. for 3 hours in the air to provide a powder catalyst composed of ceria/zirconia/gadolinium oxide composite oxide supporting 0.5% of rhodium thereon.

Preparation Example 9

77.83 g of cerium nitrate ($Ce(NO_3)_3 \cdot 6H_2O$), 36.03 g of oxyzirconium nitrate ($ZrO(NO_3)_2$) and 35.26 g of praseodymium nitrate ($Pr(NO_3)_3 \cdot 6H_2O$) were dissolved in 1700 ml of ion-exchanged water to prepare a solution. 0.1N ammonium hydroxide solution was added to the solution to neutralize and hydrolyze the cerium salt, zirconium salt and praseodymium salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/praseodymium oxide composite oxide powder (having an oxide weight ratio of 47/33/22 and having a specific surface area of 205 $m^2/g$).

4.20 g of palladium nitrate solution (9.0% as rhodium) was added to 100 ml of ion-exchanged water to prepare a solution. 30 g of the ceria/zirconia/praseodymium oxide composite oxide powder was added to the solution, followed by drying at 100° C. with agitation and calcining at 500° C. for 3 hours in the air to provide a powder catalyst composed of ceria/zirconia/praseodymium oxide composite oxide supporting 1% of palladium thereon.

Preparation Example 10

109.43 g of cerium nitrate ($Ce(NO_3)_3 \cdot 6H_2O$), 31.27 g of oxyzirconium nitrate ($ZrO(NO_3)_2$) and 15.63 g of neodymium nitrate ($Nd(NO_3)_3 \cdot 6H_2O$) were dissolved in 1700 ml of ion-exchanged water to prepare a solution. 0.1N ammonium hydroxide solution was added to the solution to neutralize and hydrolyze the cerium salt, zirconium salt and neodymium salt, followed by ageing for one hour. The resulting slurry was filtered to collect the resulting products, and the product was dried at 120° C. for 24 hours. The dried product was then calcined in the air at 500° C. for three hours, thereby providing ceria/zirconia/neodymium oxide composite oxide powder (having an oxide weight ratio of 70/20/10 and having a specific surface area of 171 $m^2/g$).

2.10 g of rhodium nitrate solution (9.0% as rhodium) was added to 100 ml of ion-exchanged water to prepare a solution. 30 g of the ceria/zirconia/neodymium oxide composite oxide powder was added to the solution, followed by drying at 100° C. with agitation and calcining at 500° C. for 3 hours in the air to provide a powder catalyst composed of ceria/zirconia/neodymium oxide composite oxide supporting 0.5% of rhodium thereon.

(3) Preparation of Honeycomb Catalyst Structures

Example 1

30 g of the powder catalyst that was composed of a mixture of γ-alumina and γ-alumina supporting 5% of iron thereon (in weight ratio of 2/1) and 1% of platinum supported on the mixture prepared in Preparation Example 1 was mixed with 3 g of silica sol (Snowtex N available from Nissan Kagaku Kogyo K.K., 20% by weight concentration in terms of silica) and an appropriate amount of water. The mixture was ground with a planetary mill for five minutes using 50 g of zirconia balls as grinding media to prepare a wash coating slurry. A cordierite honeycomb substrate which had a cell number of 400 per square inch was coated with the slurry to provide a honeycomb structure having an inner catalyst layer composed of the powder catalyst on the surface and having a thickness of 30 μm.

30 g of the powder catalyst composed of ceria supporting 1% of rhodium thereon prepared in Preparation Example 5 was mixed with 3 g of silica sol (Snowtex N available from Nissan Kagaku Kogyo K.K., 20% by weight concentration in terms of silica) and an appropriate amount of water. Using the mixture, a slurry was prepared in the same manner as above. The slurry was then was coated on the inner catalyst layer to provide a honeycomb catalyst structure having an outer catalyst layer composed of ceria supporting 1% of rhodium thereon and having a thickness of 60 μm.

Example 2

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 30 μm and an outer catalyst layer composed of ceria/praseodymium oxide composite oxide (having an oxide weight ratio of 60/40) supporting 0.2% of rhodium thereon prepared in Preparation Example 6 and having a thickness of 60 μm.

Example 3

In the same manner as Example 1, there was prepared a honeycomb catalyst structure having an inner catalyst layer that was composed of a mixture of γ-alumina and γ-alumina supporting 1% of cobalt thereon (in a weight ratio of 1/1) and 1% of platinum and 0.5% of rhodium supported on the mixture prepared in Preparation Example 3 and having a thickness of 30 μm and an outer catalyst layer composed of ceria/praseodymium oxide composite oxide (having an oxide weight ratio of 60/40) supporting 0.2% of rhodium thereon prepared in Preparation Example 6 and having a thickness of 60 μm.

Example 4

In the same manner as Example 1, there was prepared a honeycomb catalyst structure having an inner catalyst layer that was composed of a mixture of γ-alumina and γ-alumina supporting 1% of iron thereon (in a weight ratio of 1/1) and 1% of platinum supported on the mixture prepared in Preparation Example 2 and having a thickness of 30 μm and an outer catalyst layer composed of ceria/praseodymium oxide composite oxide (having an oxide weight ratio of 60/40) supporting 0.2% of rhodium thereon prepared in Preparation Example 6 and having a thickness of 60 μm.

Example 5

In the same manner as Example 1, there was prepared a honeycomb catalyst structure having an inner catalyst layer that was composed of a mixture of γ-alumina and γ-alumina supporting 1% of nickel thereon (in a weight ratio of 1/1) and 1% of platinum and 0.5% of palladium supported on the mixture prepared in Preparation Example 4 and having a thickness of 30 μm and an outer catalyst layer composed of ceria/zirconia/lanthanum oxide composite oxide (having an oxide weight ratio of 22/73/5) supporting 0.5% of rhodium thereon prepared in Preparation Example 7 and having a thickness of 60 μm.

Example 6

In the same manner as Example 1, there was prepared a honeycomb catalyst structure having an inner catalyst layer that was composed of a mixture of γ-alumina and γ-alumina supporting 1% of iron thereon (in a weight ratio of 1/1) and 1% of platinum supported on the mixture in Preparation Example 2 and having a thickness of 30 μm and an outer catalyst layer composed of ceria/zirconia/gadolinium oxide composite oxide (having an oxide weight ratio of 72/24/4) supporting 0.5% of rhodium thereon prepared in Preparation Example 8 and having a thickness of 60 μm.

Example 7

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 30 μm and an outer catalyst layer composed of ceria/zirconia/praseodymium oxide composite oxide (having an oxide weight ratio of 47/33/22) supporting 1% of palladium thereon prepared in Preparation Example 9 and having a thickness of 60 μm.

Example 8

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 30 μm and an outer catalyst layer composed of ceria/zirconia/neodymium oxide composite oxide (having an oxide weight ratio of 70/20/10) supporting 0.5% of rhodium thereon prepared in Preparation Example 10 and having a thickness of 60 μm.

Example 9

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 20 μm and an outer catalyst layer composed of ceria/praseodymium oxide composite oxide (having an oxide weight ratio of 60/40) supporting 0.2% of rhodium thereon prepared in Preparation Example 6 and having a thickness of 60 μm.

Example 10

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 20 μm and an outer catalyst layer composed of ceria/praseodymium oxide composite oxide (having an oxide weight ratio of 60/40) supporting 0.2% of rhodium thereon prepared in Preparation Example 6 and having a thickness of 80 μm.

Example 11

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 15 μm and an outer catalyst layer composed of ceria/praseodymium oxide composite oxide (having an oxide weight ratio of 60/40) supporting 0.2% of rhodium thereon prepared in Preparation Example 6 and having a thickness of 30 μm.

Example 12

In the same manner as Example 1, there was prepared a honeycomb catalyst structure having an inner catalyst layer that was composed of a mixture of γ-alumina and γ-alumina supporting 5% of iron thereon (in a weight ratio of 2/1) and 1% of platinum supported on the mixture prepared in Preparation Example 1 and having a thickness of 30 μm and an outer catalyst layer composed of ceria/praseodymium oxide composite oxide (having an oxide weight ratio of 60/40) supporting 0.2% of rhodium thereon prepared in Preparation Example 6 and having a thickness of 20 μm.

Comparative Example 1

The ceria powder prepared in Preparation Example 5 and the powder of a mixture of γ-alumina and γ-alumina supporting 5% of iron thereon were dry mixed in a weight ratio of 2/1, and 1% of platinum was supported on the resultant mixture. Using 30 g of the thus prepared mixture, a wash coating slurry was prepared in the same manner as Example 1. The slurry was then coated on the same cordierite honeycomb substrate as used in Example 1 in the same manner as Example 1 thereby providing a honeycomb catalyst structure having a layer of the catalyst on the surface 80 μm in thickness.

(4) Performance Tests

The performance of the catalyst structures prepared in Examples and Comparative Examples was measured under the same conditions as those of the first invention. The results are shown in Table 3. As is apparent from the Table 3, the catalysts of the invention achieve high conversion of nitrogen oxides, whereas the catalysts according to Comparative Examples have on the whole a low conversion rate of nitrogen oxides.

TABLE 3

| | | Nox Removal Rate (%) Temperature (° C.) | | | | | | |
|---|---|---|---|---|---|---|---|---|
| | | 200 | 250 | 300 | 350 | 400 | 450 | 500 |
| Example 1 | 3/30 | 92.3 | 98.6 | 99.1 | 98.8 | 97.4 | 93.2 | 84.1 |
| | 6/60 | 90.1 | 97.9 | 98.8 | 98.4 | 96.9 | 92.7 | 83.1 |
| | 12/120 | 84.6 | 87.0 | 89.5 | 86.1 | 81.1 | 75.4 | 54.9 |
| Example 2 | 6/60 | 88.5 | 94.8 | 98.2 | 99.7 | 98.5 | 96.3 | 89.7 |
| Example 3 | 6/60 | 83.7 | 92.5 | 95.2 | 95.8 | 94.5 | 88.4 | 76.8 |
| Example 4 | 6/60 | 89.5 | 96.1 | 97.8 | 98.5 | 98.2 | 91.0 | 81.8 |
| Example 5 | 6/60 | 91.3 | 96.7 | 98.6 | 95.0 | 89.3 | 71.4 | 61.4 |
| Example 6 | 6/60 | 78.9 | 85.2 | 96.5 | 97.3 | 96.7 | 94.1 | 82.0 |
| Example 7 | 6/60 | 92.7 | 96.3 | 97.4 | 94.7 | 87.9 | 77.6 | 64.8 |
| Example 8 | 6/60 | 87.2 | 93.5 | 94.7 | 96.9 | 97.3 | 95.0 | 86.3 |
| Example 9 | 6/60 | 88.3 | 94.8 | 98.3 | 99.7 | 98.4 | 96.0 | 89.4 |
| Example 10 | 6/60 | 84.2 | 94.0 | 98.0 | 99.6 | 98.7 | 96.7 | 91.1 |
| Example 11 | 6/60 | 83.0 | 89.2 | 91.9 | 87.4 | 79.5 | 73.1 | 58.7 |
| Example 12 | 6/60 | 52.3 | 62.8 | 65.4 | 61.0 | 54.9 | 43.8 | 35.6 |
| Comparative Example 1 | 6/60 | 81.3 | 93.4 | 95.2 | 94.7 | 92.8 | 83.0 | 71.0 |

Furthermore, using the catalyst structures prepared in Example 7 and Comparative Example 1, catalyst durability tests were carried out under the same gas conditions as mentioned above at a temperature of 350° C. with a rich/lean span of 55/5 (s/s) over a period of 50 hours. As clear from the results shown in Table 4, the catalyst of the invention has much higher resistance to sulfur oxides than the known NOx storage reduction system.

TABLE 4

| | Nox Removal Rate (%) Running Time (h) | | | | | |
|---|---|---|---|---|---|---|
| | 0 | 10 | 20 | 30 | 40 | 50 |
| Example 7 | 98.4 | 98.4 | 98.7 | 98.5 | 98.4 | 98.3 |
| Comparative Example 1 | 94.7 | 48.8 | 31.3 | 18.5 | 8.0 | 4.9 |

The invention claimed is:

1. A method for catalytic reduction of nitrogen oxides in exhaust gases which comprises supplying and subjecting fuel to combustion with periodic rich/lean excursions wherein rich conditions have an air/fuel weight ratio of 10-14 and lean conditions have an air/fuel weight ratio of 20-40 and mainly under the lean conditions and contacting the resulting exhaust gases with a catalyst which comprises:
   (A) an outer catalyst layer comprising at least 80% by weight of an outer layer catalyst component wherein the outer layer catalyst component consists essentially of a first catalyst component consisting essentially of a mixture or a composite oxide (except mixtures or composite oxides of cerium oxides and zirconium oxides) of
      (a) ceria and
      (b) at least one oxide of at least one element selected from zirconium, gadolinium, terbium, samarium and lanthanum, and 0.05–3% by weight of a second catalyst component consisting essentially of
   (c) at least one catalyst component selected from rhodium and its oxides, and
   (B) an inner catalyst layer comprising at least 50% by weight of an inner layer catalyst component wherein the inner layer catalyst component comprises
      (a) 0.05–5% by weight in terms of metals of at least one catalyst component selected from platinum, rhodium and their oxides, and
      (b) a carrier material.

2. The method according to claim 1 for catalytic reduction of nitrogen oxides in exhaust gases which comprises supplying and subjecting fuel to combustion with periodic rich/lean excursions wherein rich conditions have an air/fuel weight ratio of 10-14 and lean conditions have an air/fuel weight ratio of 20-40 and mainly under the lean conditions and contacting the resulting exhaust gases with a catalyst structure wherein the catalyst structure comprises, on an inactive substrate:
   (A) an outer catalyst layer comprising at least 80% by weight of an outer layer catalyst component wherein the outer layer catalyst component consists essentially of a first catalyst component consisting essentially of a mixture or a composite oxide (except mixtures or composite oxides of cerium oxides and zirconium oxides) of
      (a) ceria and
      (b) at least one oxide of at least one element selected from zirconium, gadolinium, terbium, samarium and lanthanum, and 0.05–3% by weight of a second catalyst component consisting essentially of
   (c) at least one catalyst component selected from rhodium and its oxides, and
   (B) an inner catalyst layer comprising at least 50% by weight of an inner layer catalyst component wherein the inner layer catalyst component comprises
      (a) 0.05–5% by weight in terms of metals of at least one catalyst component selected from platinum, rhodium and their oxides, and
      (b) a carrier material.

3. A method for catalytic reduction of nitrogen oxides in exhaust gases which comprises supplying and subjecting fuel to combustion with periodic rich/lean excursions wherein rich conditions have an air/fuel weight ratio of 10-14 and lean conditions have an air/fuel weight ratio of 20-40 and mainly under the lean conditions and contacting the resulting exhaust gases with a catalyst which comprises:
   (A) an outer catalyst layer comprising at least 80% by weight of an outer layer catalyst component wherein the outer layer catalyst component consists essentially of a first catalyst component consisting essentially of
      (a) ceria or
      (b) praseodymium oxides or
      (c) a mixture or a composite oxide of ceria and at least one oxide of elements selected from zirconium, praseodymium, neodymium, gadolinium and lanthanum, and 0.05–3% by weight of a second catalyst component consisting essentially of
      (d) at least one catalyst component selected from rhodium and its oxides, and
   (B) an inner catalyst layer comprising at least 50% by weight of an inner layer catalyst component wherein the inner layer catalyst component comprises (a) 0.05–5% by weight in terms of metals of at least one catalyst component selected from platinum, rhodium and their oxides, (b) a co-catalyst comprising ions and/or oxides of at least one element selected from iron and cobalt, the co-catalyst being contained in an amount of 1- 10% by weight based on the weight of the inner catalyst layer, and (c) a carrier material.

4. The method according to claim 3 for catalytic reduction of nitrogen oxides in exhaust gases which comprises supplying and subjecting fuel to combustion with periodic rich/lean excursions wherein rich conditions have an air/fuel weight ratio of 10-14 and lean conditions have an air/fuel weight ratio of 20-40 and mainly under the lean conditions and contacting the resulting exhaust gases with a catalyst structure wherein the catalyst structure comprises, on an inactive substrate:

(A) an outer catalyst layer comprising at least 80% by weight of an outer layer catalyst component wherein the outer layer catalyst component consists essentially of a first catalyst component consisting essentially of (a) ceria or (b) praseodymium oxides or (c) a mixture or a composite oxide of ceria and at least one oxide of elements selected from zirconium, praseodymium, neodymium, gadolinium and lanthanum, and 0.05–3% by weight of a second catalyst component consisting essentially of (d) at least one catalyst component selected from rhodium and its oxides, and (B) an inner catalyst layer comprising at least 50% by weight of an inner layer catalyst component wherein the inner layer catalyst component comprises (a) 0.05–5% by weight in terms of metals of at least one catalyst component selected from platinum, rhodium and their oxides, (b) a co-catalyst comprising ions and/or oxides of at least one element selected from iron and cobalt, the co-catalyst being contained in an amount of 1–10% by weight based on the weight of the inner catalyst layer, and (c) a carrier material.

* * * * *